Dec. 13, 1927.
F. V. DETWILER
1,652,300
FIRELESS COOKER
Original Filed June 19, 1922
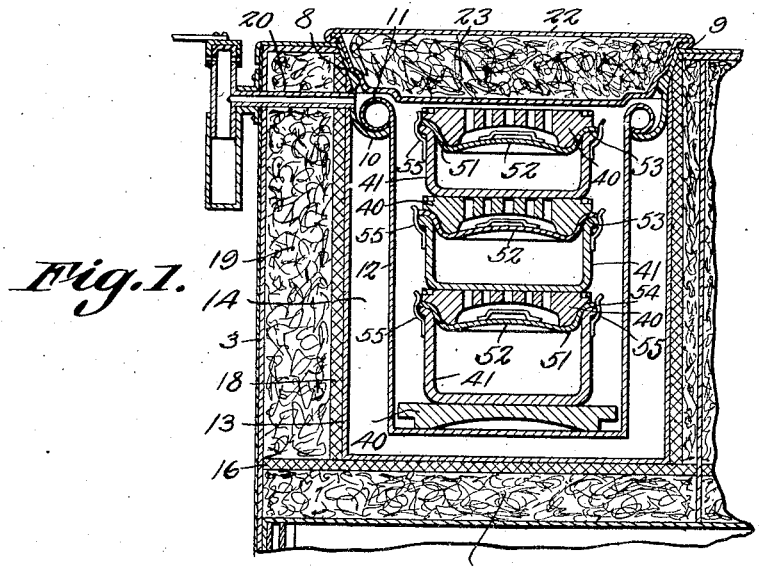
Fig. 1.
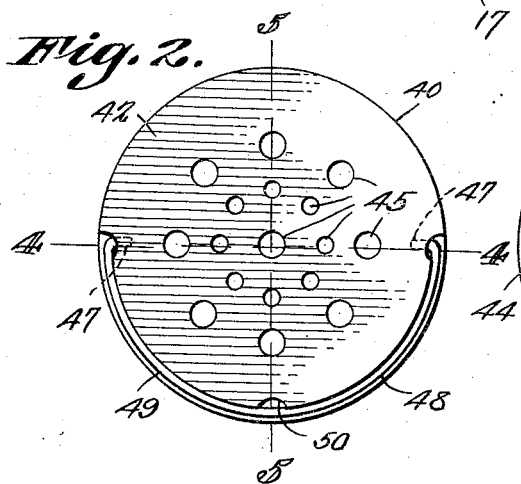
Fig. 2.
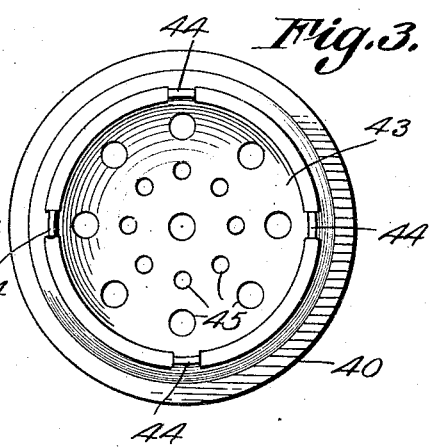
Fig. 3.
Fig. 4.
Fig. 5.
Forest V. Detwiler
Inventor
By C.A.Snow&Co.
Attorneys.

Patented Dec. 13, 1927.

1,652,300

UNITED STATES PATENT OFFICE.

FOREST V. DETWILER, OF POTTSTOWN, PENNSYLVANIA.

FIRELESS COOKER.

Application filed June 19, 1922, Serial No. 569,266. Renewed April 30, 1927.

This invention relates to fireless cookers and more especially to heat accumulators of novel construction for use in connection with utensils in the cooker, the heat accumulators and utensils being so constructed as to be nested readily to secure the greatest possible efficiency.

Another object is to provide heat accumulators so constructed that air is permitted to circulate freely through them, thus quickly to dissipate the heat contained within the accumulators so that they can be used to the best advantage in cooking food within the apparatus.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed, without departing from the spirit of the invention.

In the accompanying drawings the preferred form of the invention has been shown.

In said drawings:

Figure 1 is a vertical section through a portion of a cooker having the present improvements combined therewith.

Figure 2 is a plan view of one of the heat accumulators.

Figure 3 is a bottom view thereof.

Figure 4 is a section on line 4—4, Figure 2.

Figure 5 is a section on line 5—5, Figure 2.

Referring to the figures by characters of reference 3 designates a portion of a fireless cooker in which is arranged an inner lining 13, suitably insulated as at 16, 17, 18 and 19 and providing a well 14. A gutter 10 is arranged within the upper portion of the well and a vent 20 is in communication with this gutter.

The well is open at the top as indicated at 8 so as to receive a cover 22 provided with insulators 23, this cover being formed with a marginal flange 9 adapted to rest upon the top of the cooker structure.

A removable lining 12 is adapted to be supported in the well 14 by means of a bead 11 extending therearound and resting in the gutter 10. This removable lining is designed to receive those parts of the structure constituting the present invention. Said structure includes heat accumulators 40 and utensils 41 which can be placed in superposed relation. As shown in the drawings each of these hot plates is preferably formed with a flat top 42 and with a concaved bottom face 43, there being spaced supporting lugs 44 projecting from the marginal portions of the concaved face. Openings 45 extend through the hot plates and extending into the periphery of the hot plates at diametrically opposed points are sockets 46. These sockets are adapted to receive fingers 47 extending inwardly or toward each other from the ends of a bail 48. The bail is substantially semi-circular and normally rests in a marginal recess 49 formed in the flat face of the hot plate along about one-half the circumference of the plate. A recess 50 is formed in the top face 42 of the hot plate and is adapted to be bridged normally by the bail 48. By inserting a suitable lifting tool in the recess 50 the bail can be readily gripped and the hot plate thus carried conveniently to place it in or remove it from the well.

Each utensil 41 is preferably provided with a cover such as shown at 51 in Figure 1. Each cover has a central concavo-convex portion 52 surrounded by a flange 53 which is tapered so as to fit snugly in the open end of the utensil. The outer marginal portion of the flange is outturned as at 54 to rest on the utensil and is adapted to be engaged by retaining devices 55 secured to the wall of the utensil.

A large heat accumulator 40 is adapted to be placed on the bottom of the well as shown in Figure 1 and will support one of the utensils 41. After the cover 52 has been placed in position a smaller heat accumulator is placed thereon and will support another utensil 41 as shown in Figure 1. By providing the openings 45 and the spaced supporting lugs 44 air is free to circulate through the heat accumulators and the heat in said accumulators will thus be quickly dissipated so as rapidly to raise the temperature of the contents of the well.

What is claimed is:

1. In a fireless cooker a heat accumulator having a flat upper face and a concaved lower face, there being openings extending through the accumulator, and spacing lugs at the periphery of the concaved face for supporting the plate.

2. In a fireless cooker a heat accumulator having a flat upper face and a concaved lower face, there being apertures extending through the accumulator, spaced supporting lugs on the accumulator, a bail having inturned fingers rotatably seated within diametrically opposed portions of the accumulator, said accumulator having a marginal recess for receiving the bail to support it below the plane of the flat face of the accumulator.

3. In a fireless cooker a heat accumulator having diametrically opposed radial sockets and a marginal recess terminating at the sockets, and a lifting bail normally seated in the marginal recess and having terminal fingers rotatably mounted in the sockets, there being a recess in one face of the accumulator and extending under the bail and intersecting the marginal recess.

In testimony that I claim the foregoing as my own, I have hereto affixed my signature.

FOREST V. DETWILER.